United States Patent [19]

Hartley et al.

[11] Patent Number: 4,765,896
[45] Date of Patent: Aug. 23, 1988

[54] BREWING FUNNEL WITH REMOVABLE INSERT

[75] Inventors: Philip G. Hartley, Toronto; Harvey W. Cheatley, Newmarket; Mitchell J. Konop, Toronto, all of Canada

[73] Assignee: Bunn-O-Matic Corporation, Springfield, Ill.

[21] Appl. No.: 866,976

[22] Filed: May 27, 1986

[30] Foreign Application Priority Data

Jun. 13, 1985 [CA] Canada .................. 483935

[51] Int. Cl.⁴ .................................. B01D 23/28
[52] U.S. Cl. ............................. 210/474; 210/479; 210/481; 99/306; 99/317
[58] Field of Search ............. 210/469, 473, 474, 477, 210/478, 479, 480, 481; 99/279, 290, 292, 295, 298, 300, 304, 317, 323, 306; 426/77, 82, 433; 220/403, 404

[56] References Cited

U.S. PATENT DOCUMENTS

| | | | |
|---|---|---|---|
| 132,963 | 11/1872 | Heermance | 210/473 |
| 1,111,249 | 9/1914 | Courtwright | 210/474 |
| 2,496,757 | 2/1950 | Sieling | 210/474 |
| 3,034,417 | 5/1962 | Burr | 99/283 |
| 3,374,897 | 3/1968 | Martin | 210/474 |
| 3,388,804 | 6/1968 | Hester | 210/477 |
| 3,593,650 | 7/1971 | Martin | 99/307 |
| 3,935,112 | 1/1976 | Greutert | 210/469 |
| 3,971,305 | 7/1976 | Daswick | 210/474 |
| 4,080,299 | 3/1978 | Bartolome | 210/479 |
| 4,642,190 | 2/1987 | Zimmerman | 210/479 |

Primary Examiner—Richard V. Fisher
Assistant Examiner—Wanda L. Millard
Attorney, Agent, or Firm—Lockwood, Alex, FitzGibbon & Cummings

[57] ABSTRACT

Beverage brewing funnel combination for supporting scrunchable disposable filters in either their non-scrunched full or normal capacity condition or in a scrunched reduced-capacity condition. The combination is formed by a funnel and a removable skeleton-like insert. The interior bottom surface of the funnel is inclined or dished toward a drain aperture and has a plurality of upstanding ribs which maintain a wet disposable filter out of adhering contact with the bottom surface when the funnel is used without the removable insert to support a disposable filter in its non-scrunched condition. When the insert is nested within the funnel it supports the disposable filters in their scrunched condition and preferably out of contact with the bottom surface of the funnel as well as the sidewall surface thereof.

6 Claims, 2 Drawing Sheets

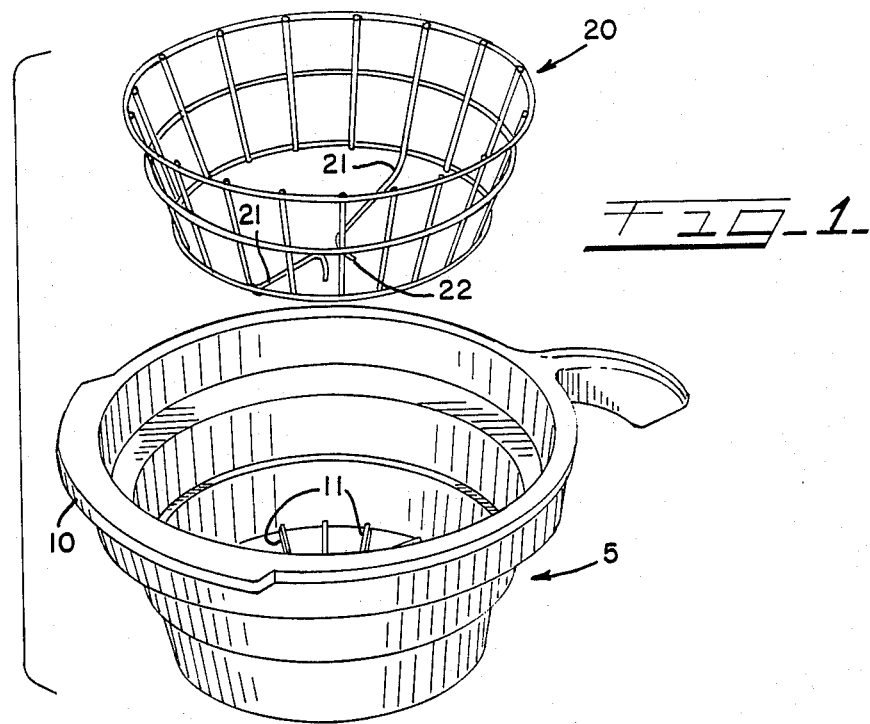
FIG_1
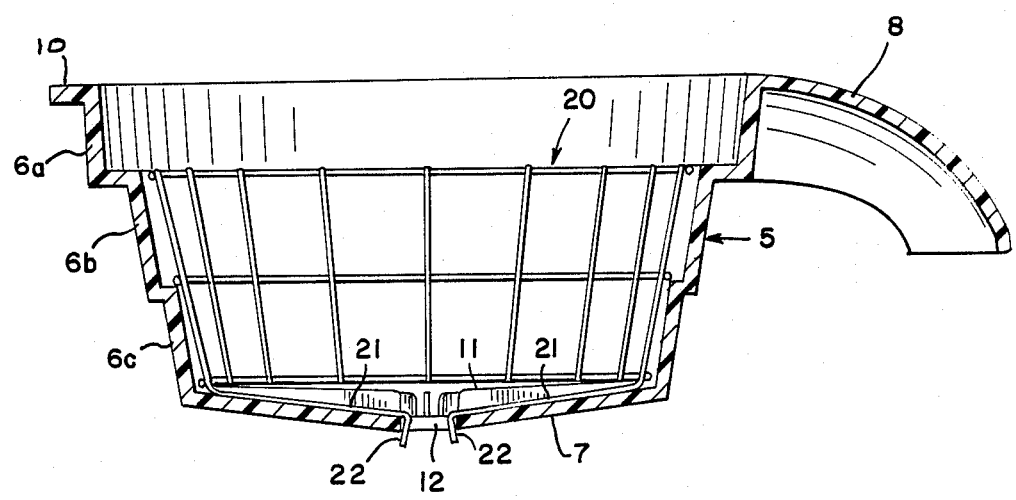
FIG_2

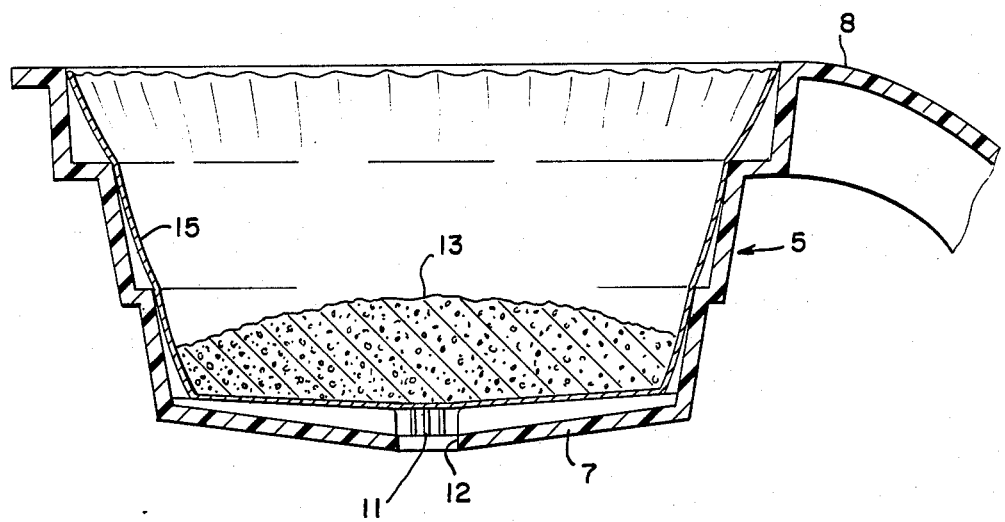
FIG_3_
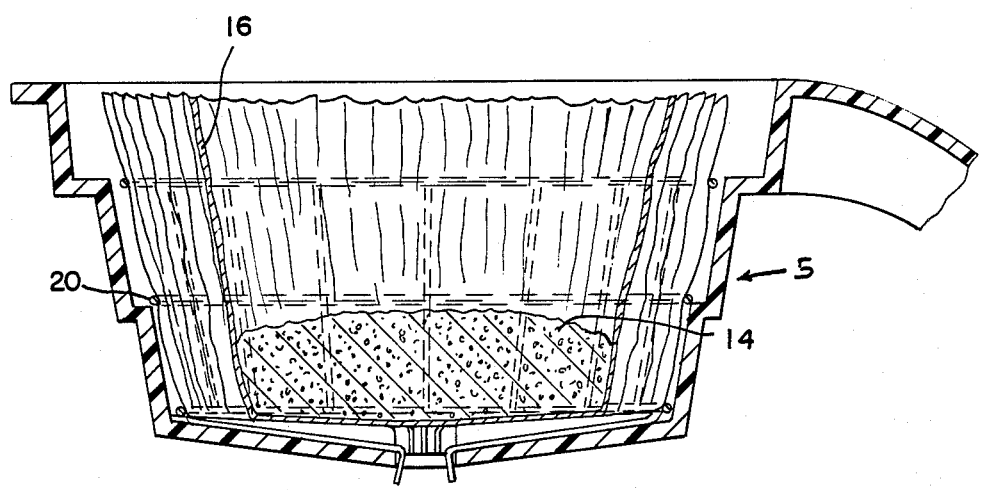
FIG_4_

BREWING FUNNEL WITH REMOVABLE INSERT

This invention relates, generally, to innovations and improvements in the so-called "brewing funnels" that are used in connection with beverage making machines of the type wherein hot water is sprayed onto ground coffee or tea resting on a disposable paper filter inserted in a funnel having a drain aperture or discharge opening in the bottom.

More particularly, the invention relates to innovations and improvements in such brewing funnels provided with skeleton-like inserts such as basket-like frames formed of wire, which can be removably inserted in funnels so as to effectively reduce the interior size or capacity thereof for supporting disposable paper filters with portions of ground coffee or tea therein. This reduction in capacity or size of the interior dimensions of a brewing funnel makes it practical to reduce the quantity of ground coffee or tea within such a filter-lined funnel without materially decreasing or altering the preferred depth of the bed of ground coffee or tea. In other words, with a skeleton-like insert in place, the charge of coffee or tea will be confined or less spread out so as to have approximately the same depth as that of a full charge of ground coffee or tea. This arrangement permits the same brewing equipment to be used for making either full batches of beverage or reduced or fractional batches, without materially changing the quality of the beverage produced.

Beverage making machines and funnels therefore of the type to which the present invention pertain are disclosed, for example, in the following Canadian and corresponding United States patents: U.S. Pat. No. 676,899 issued Dec. 31, 1963 (U.S. Pat. No. 3,034,417); U.S. Pat. No. 814,141 issued June 3, 1969 (U.S. Pat. No. 3,374,897); and U.S. Pat. No. 889,595 issued Jan. 4, 1972 (U.S. Pat. No. 3,593,650). U.S. Pat. Nos. 676,899 and 814,141 disclose beverage making machines of the type used for producing batches of coffee in glass decanters or pots whereas U.S. Pat. No. 889,595 discloses an urn type coffee brewer wherein relatively large batches of coffee are prepared and retained in coffee urns. However, both types of beverage making machines utilize beverage funnels of the same general type with the brewing funnels for the urn type coffee making machines being generally larger than those for the non-urn type of coffee making machine.

As is generally known, in utilizing brewing funnels of the type shown in the above-mentioned patents, a disposable paper filter is removed from a densely nested stack of paper filters and inserted in a rigid brewing funnel. A charge or portion of ground coffee or tea is then deposited onto the filter and the funnel thus loaded or charged is inserted into the beverage making machine where it is positioned under a hot water sprayhead. In operation, hot water is delivered to the sprayhead from which it sprays onto the coffee or tea within the paper filter supported within the rigid funnel. As the hot water accumulates within the funnel it begins to extract the coffee or tea flavor and flow out a drain or discharge outlet opening in the bottom of the funnel. The extraction process continues and ultimately the hot beverage drains from the funnel leaving depleted or extracted coffee grounds or tea leaves remaining within the paper filter. The filter with the depleted coffee grounds or tea leaves is removed from the funnel and disposed of, and the funnel is rinsed or washed making it ready to receive another filter with a charge of ground coffee or tea.

It was found at an early date that best results were obtained when the disposable paper filters were supported in spaced relationship with respect to the interiors of the brewing funnels and particularly the bottoms thereof since otherwise the wet filters tended to seal to the interior surfaces, particularly the bottoms of the funnels. An early solution to the problem of the adhering or sealing of the disposable paper filters to the smooth interior surfaces of the brewing funnels is disclosed in U.S. Pat. No. 676,899 wherein an insert or basket formed of wire and designated at 64 in FIGS. 6 and 7 was inserted into a rigid brewing funnel 69. Subsequently, a different solution to the problem of sticking or adhering of the wet disposable filters to the interiors of the brewing funnels was provided by designing the brewing funnels with stepped sidewalls and providing the dished bottoms thereof with upstanding radial ribs. The brewing funnels shown in U.S. Pat. Nos. 814,141 and 889,595 disclose funnels of this latter type.

While brewing funnels of the foregoing types, the one with smooth interiors with provision for retaining wire baskets or frames removable for cleaning and the other type represented by funnels usually formed of molded plastic materials and having stepped sidewalls and dished bottoms with upstanding rib formations, function and serve very satisfactorily from the standpoint of supporting disposable paper filters and their contents of beverage making materials while preventing the adherence or sealing of the wet filters to the interiors of the funnels, neither type of brewing funnel satisfy a further longstanding requirement. Not infrequently in the use of beverage making machines of the foregoing type there is a requirement for producing fractional batches of beverage of substantially reduced sized in respect to the normal or full sizes of the batches for which the various beverage machines are designed and intended. In order to meet this requirement, the practice has been to use the brewing funnels and disposable paper filters in the ordinary manner but charge the same with reduced amounts of coffee or tea. When this practice is followed, it results in extraction beds that are thinner or of less depth than normal. However, when the depths of the extraction beds are reduced appreciably below the normal optimums there is an increasing impairment in the quality of the brewed beverage. Accordingly, there has been a tendency to produce either full batches or larger than necessary batches and intentionally waste a certain amount of the produced beverage rather than accept a beverage of impaired quality.

The object of the present invention, generally stated, is the provision of beverage brewing funnel combinations or assemblies which can readily be used with or without their open basket or frame-type inserts so that the brewing funnels in effect have a full or normal capacity mode and a reduced capacity mode, with the extraction beds of ground coffee or tea being approximately the same in both modes.

A further object of the invention is the provision of a brewing funnel combination of the foregoing type in which a conventional brewing funnel having a stepped sidewall and a dished bottom with an upstanding rib formation can be used in making full size batches or provided with a readily removable insert or basket formed of wire which allows the same brewing funnel to be used in producing substantially reduced size batches but without appreciable reduction in the depth of the extraction bed or appreciable impairment of the quality cf the beverage produced.

Certain other objects of the invention will become apparent from the following description of a preferred embodiment of the invention taken in connection with the accompanying drawings wherein:

FIG. 1 is a exploded perspective view of the brewing funnel combination forming one embodiment of the present invention;

FIG. 2 is a vertical sectional view of the brewing funnel combination shown in FIG. 1 in assembled relation;

FIG. 3 is a vertical sectional view of the brewing funnel of FIGS. 1 and 2 without the basket insert and with a disposable filter in place together with a full portion or charge of ground coffee; and FIG. 4 is a vertical sectional view similar to FIG. 3 but with the wire basket or insert of FIGS. 1 and 2 in place along with a disposable filter in a scrunched condition and with a fractional charge or portion of ground coffee or tea.

In FIGS. 1-4 a brewing funnel is indicated generally at 5 which corresponds generally to the brewing funnel indicated generally at 24 in FIGS. 7 and 8 of U.S. Pat. No. 889,595 (U.S. Pat. No. 3,593,650). The funnel 5 is formed of molded plastic and is generally frusto-conical in shape with a sidewall formed of a series of integral stepped sections 6a, b, c with a dished or concave bottom 7 and an integral handle 8 and arcuate lip 10.

The interior surface of the dished bottom 7 is provided with a plurality of radial upstanding ribs 11—11. Preferably, the ribs 11 have three different lengths and are grouped or patterned as shown in FIG. 7 of U.S. Pat. No. 889,595 (U S. Pat. No. 3,593,650).

The dished bottom 7 inclines to a central drain or discharge opening 12 through which beverage drains from the funnel 5 after having extracted the charge or portion of ground coffee or tea 13 (FIG. 3) or 14 (FIG. 4) resting on a disposable paper filter 15 or 16, respectively therein.

The funnel 5 may be used alone and have a disposable paper filter 15 deposited therein with a full or normal charge of ground coffee or tea 13 as shown in FIG. 3. The funnel 5 is also capable of having the skeleton-like or frame-like basket insert 20 inserted therein as shown in FIG. 2 and then utilized with a paper filter 16 in scrunched condition with a reduced charge or portion 14 of ground coffee or tea. Preferably the insert of basket 20 is formed of wire with at least two elements 21—21 thereof being formed of a spring wire material. The free or distal ends 22 of the wire elements 21 are bent downwardly and outwardly as shown in FIGS. 1, 2 and 4 so as to have such length and configuration as to protrude through the drain opening 12 in gripping relationship therewith. This gripping relationship serves to retain the insert or basket 20 within the funnel 5 even when the basket with a filter and the depleted or extracted charge of ground coffee or tea is inverted and the filter and the depleted charge allowed to fall out of the funnel. However, the spring nature of the wires 21 allow the distal ends 22 to be moved toward each other so that the wire basket or insert 20 can be withdrawn or removed from the funnel 5 when desired.

It will be seen from a comparison of the sizes of the charges or portions of ground coffee 13 or 14 shown in FIGS. 3 and 4, respectively that while these portions or charges have approximately the same bed depth the size or the charge 14 is substantially less than that of the charge 13. Accordingly, the extraction process can take place in substantially the same way in the partial charge or portion of ground coffee or tea 14 in FIG. 4 as normally occurs in the extraction of the full or normal charge 13 in FIG. 3. Thus, batches of brewed coffee or tea can be prepared of reduced or fractional size without impairment in the quality such as would occur if the depth of the reduced charge or portion 14 was substantially less as would be the case if the wire insert or basket was not used and the filter 16 was not scrunched to a reduced capacity condition.

It will be appreciated that various changes can be made in the combined brewing funnel and insert combination shown and described in connection with FIGS. 1-4. Thus, the brewing funnel 5 can be formed of metal instead of plastic whereas the insert or basket 20 could be formed of a suitable plastic instead of being formed of wire. Likewise, the configurations of the funnel 5 and the insert or basket 20 can be changed from the shapes or designs shown.

What is claimed is:

1. Brewing funnel means for supporting disposable filters in either a scrunched reduced-capacity condition or a non-scurnched full-capacity condition with the bottom of the filters spaced from the bottom of the funnel in either of said conditions, comprising, in combination:
    a funnel of generally rusto-conical shape and having an interior bottom surface dished toward a drain aperture and having a plurality of integral ribs upstanding from said interior bottom surface and of such number and orientation as to maintain the bottom of a said disposable filter in its non-scrunched full-capacity condition spaced from said interior bottom surface; and
    a removable skeleton-like basket nestable within said funnel for supporting a said disposable filter therein in its said scrunched reduced-capacity condition and said basket having retention means cooperable with said drain aperture.

2. The brewing funnel means of claim 1 wherein said removable skeletion-like basket is in the form of a wire frame.

3. The brewing funnel means of claim 1, wherein said basket is fabricated from spring wire stock and including said retention means is a pair of wire prongs.

4. Brewing funnel means for supporting a disposable filter containing a quantity of ground coffee, comprising, in combination:
    a funnel having a dished bottom wall with a central drain aperture extending through and flush with said wall; and
    a removable insert for supporting thereon a said disposable filter containing a quantity of ground coffee with said disposable filter covering at least the interior surface of said funnel bottom wall and said removable insert having relesable retention means projecting through and cooperable with said drain aperture.

5. Brewing funnel means for supporting disposable filters in either a scrunched reduced-capacity condition or a non-scrunched full-capacity condition with the bottom of the filters spaced from the bottom of the funnel in either of said conditions, comprising, in combination:
    a funnel of generally frusto-conical shape and having an interior bottom surface dished toward a drain aperture and having a plurality of integral ribs upstanding from said interior bottom surface and of such number and orientation as to maintain the bottom of a said disposable filter in its non-scrunched full-capacity condition spaced from said interior bottom surface, and a removable skeleton-like basket nestable within said funnel for supporting a said disposable filter therein in its said scurnched reduced-capacity condition, said removable skeleton-like basket being in the form of a wire frame and said retention means comprising a pair of wire prongs projecting through said drain aperture and having gripping engagement with opposing sides of said aperture.

6. Brewing funnel means for supporting a disposable filter containing a quantity of ground coffee, comprising, in combination:

a funnel having a bottom with a drain aperture therein; and a removable insert covering at least the interior surface of said funnel bottom and having releasable retention menas cooperable with said drain aperture, said insert being in the form of a wire frame and said retention means comprising a pair of outwardly extending spring wire prongs projecting engagement with opposing sides of said aperture.

* * * * *

UNITED STATES PATENT AND TRADEMARK OFFICE
CERTIFICATE OF CORRECTION

PATENT NO. : 4,765,896

DATED : August 23, 1988

INVENTOR(S) : Philip G. Hartley et al.

It is certified that error appears in the above-identified patent and that said Letters Patent is hereby corrected as shown below:

Column 1, lines 34, 36, 37 and 41, delete "U.S.Pat." and insert --Patent--;
Column 1, line 38, delete "U.S.Pat." and insert --Patents--.

Column 2, line 12, delete "U.S.Pat." and insert --Patent--; line 20, delete "U.S. Pat." and insert --Patents--.

Column 3, line 24, delete "U.S.Pat." and insert --Patent--; lines 33, delete "U.S." ; line 34, "Pat." (first occurrence) should read --Patent--.

Column 4, claim 3, line 3 thereof, delete "is" and insert --as--.

Column 6, claim 6, at the end of line 11, insert --through said drain aperture and having releasably gripping--

Signed and Sealed this

Twenty-fourth Day of April, 1990

Attest:

HARRY F. MANBECK, JR.

*Attesting Officer*    *Commissioner of Patents and Trademarks*